(12) United States Patent
Song

(10) Patent No.: US 7,184,108 B2
(45) Date of Patent: Feb. 27, 2007

(54) DISPLAY DEVICE AND DIODE ARRAY PANEL THEREFOR

(75) Inventor: Jang-Kun Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 142 days.

(21) Appl. No.: 10/809,400

(22) Filed: Mar. 26, 2004

(65) Prior Publication Data

US 2004/0189885 A1 Sep. 30, 2004

(30) Foreign Application Priority Data

Mar. 28, 2003 (KR) .................... 10-2003-0019565

(51) Int. Cl.
*G02F 1/136* (2006.01)
(52) U.S. Cl. .................... 349/51; 349/49; 349/50; 349/52; 349/53; 345/91
(58) Field of Classification Search ............ 349/49–52, 349/53; 345/91
See application file for complete search history.

(56) References Cited

U.S. PATENT DOCUMENTS 4,728,172 A * 3/1988 Cannella .................... 349/50
5,893,621 A * 4/1999 Sekiguchi .................... 349/51
6,243,062 B1 * 6/2001 den Boer et al. ............. 345/91
6,593,991 B2 * 7/2003 Ishimoto .................... 349/139
6,914,641 B2 * 7/2005 Choo et al. .................... 349/38

FOREIGN PATENT DOCUMENTS

JP 04165333 A * 6/1992

* cited by examiner

*Primary Examiner*—Andrew Schechter
*Assistant Examiner*—(Nancy) Thanh-Nhan P. Nguyen
(74) *Attorney, Agent, or Firm*—F. Chau & Associates, LLC

(57) ABSTRACT

A liquid crystal display is provided, which includes: a pair of first and second signal lines transmitting select pulses having opposite polarity; a third signal line transmitting data voltages; first and second field generating electrodes separated from each other with a gap; and a plurality of diodes connected between the first and the second signal lines and the first and the second field generating electrodes and providing at least two different resistances.

10 Claims, 5 Drawing Sheets

DISPLAY DEVICE AND DIODE ARRAY PANEL THEREFOR

BACKGROUND OF THE INVENTION

1. Field of the Invention

The present invention relates to a display device and a diode array panel therefor.

2. Description of Related Art

A liquid crystal display (LCD) is one of the most widely used flat panel displays. An LCD includes two panels provided with field-generating electrodes and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

The field-generating electrodes in an active matrix LCD are driven by a plurality of switching elements such as transistors and diodes. A representative of a switching diode is a metal-insulator-metal (MIM) diode including two metal electrodes interposing an insulator with a thickness of about tens of nano meters and showing electrical nonlinearity. The MIM diode has a simple structure that can be manufactured by a simple process compared with a thin film transistor.

The MIM diode LCD is suggested to be driven by so called a dual select diode (DSD) scheme that symmetrically connects a pair of diodes to a field generating electrode and applies a pair of select pulses having opposite polarity. The DSD driving improves the uniformity of the images, the contrast ratio, and the response time of the LCD.

However, the gamma curve at a front side of the DSD LCD does not coincide with that at a lateral side and thus the DSD LCD shows lower visibility in the lateral sides. For example, the luminance increases and white color becomes dominant as it goes to the lateral sides, and, in the worst case, the difference in the luminance between higher grays vanishes.

SUMMARY OF THE INVENTION

A liquid crystal display is provided, which includes: a pair of first and second signal lines transmitting select pulses having opposite polarity; a third signal line transmitting data voltages; first and second field generating electrodes separated from each other with a gap; and a plurality of diodes connected between the first and the second signal lines and the first and the second field generating electrodes and providing at least two different resistances.

The third signal line may have at least one cutout or protrusion.

A diode array panel for a display device is provided, which includes: a substrate; a pair of first and second signal lines transmitting select pulses having opposite polarity; first and second field generating electrodes separated from each other with a gap; and a plurality of diodes connected between the first and the second signal lines and the first and the second field generating electrodes and providing at least two different resistances.

The diodes may include MIM diodes.

The MIM diodes may include first and second input electrodes connected to the first and the second signal lines, respectively, first and second insulators disposed on the first and the second input electrodes, respectively, and first and second diodes disposed on the first and the second insulators, respectively, and connected to the first and the second bottom electrodes, respectively.

BRIEF DESCRIPTION OF THE DRAWINGS

The present invention will become more apparent by describing preferred embodiments thereof in detail with reference to the accompanying drawings in which.

DETAILED DESCRIPTION OF EMBODIMENTS

Figure 1:
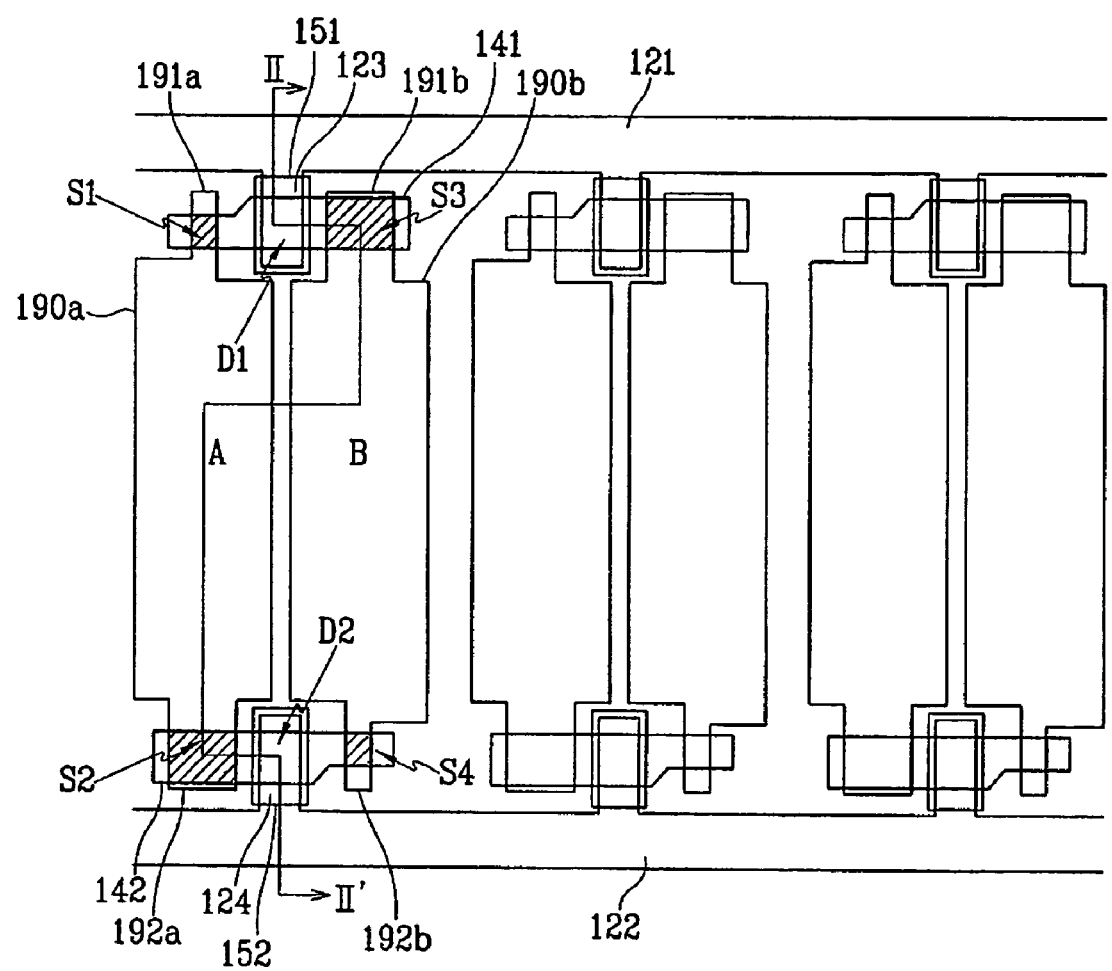
FIG. 1 is a layout view of a TFD array panel for an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film diode (TFD) array panels for LCDs according to embodiments of the present invention will be described with reference to the accompanying drawings.

First, an LCD according to an embodiment of the present invention is described in detail with reference to FIGS. 1 and 2.

Figure 2:
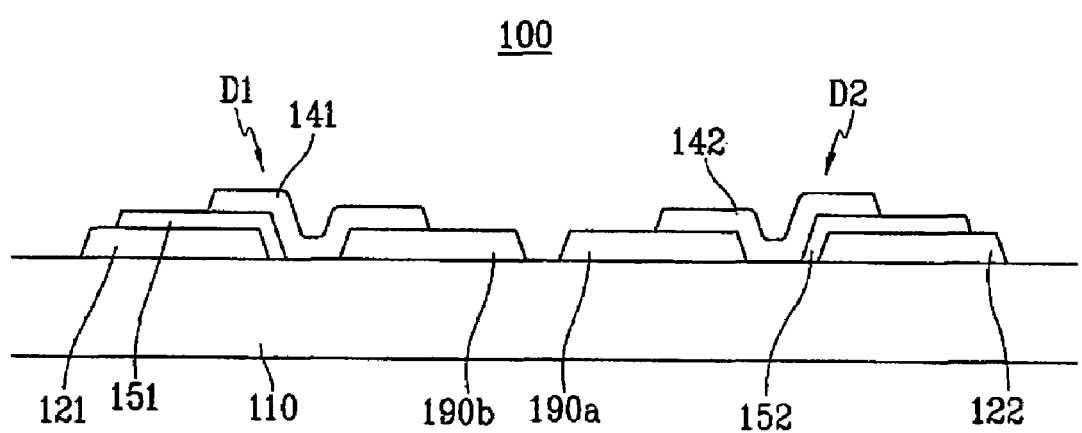
FIG. 2 is a sectional view of the TFD array panel shown in FIG. 1 taken along the line II–II'.

FIG. 1 is a layout view of a TFD array panel for an LCD according to an embodiment of the present invention, and FIG. 2 is a sectional view of the TFD array panel shown in FIG. 1 taken along the line II–II'.

A liquid crystal display according to an embodiment of the present invention includes a lower panel called a TFD array panel 100 shown in FIGS. 1 and 2, an upper panel (not shown) facing the lower panel 100, and a liquid crystal layer (not shown) interposed therebetween.

The upper panel includes an insulating substrate (not shown), and a plurality of data lines (not shown) and a plurality of color filters (not shown) that are formed on the substrate.

Concerning the lower panel 100 with reference to FIGS. 1 and 2, a plurality of first and second select lines 121 and 122 extending in a transverse direction are formed on an insulating substrate 110 preferably made of transparent glass. The select lines 121 and 122 transmit select pulses having opposite polarities and reversed every frame. The first/second select lines 121 and 122 include a plurality of first/second input electrodes 123 and 124 branched therefrom, and the first input electrodes 123 and the second input electrodes 124 extend toward each other. The select lines 121 and 122 are preferably made of Ta, but they may include other low resistivity metal.

A buffer layer (not shown) preferably made of tantalum oxide may be formed on the substrate 110.

The first/second input electrodes 123 and 124 are covered with first/second insulators 151 and 152 preferably including a tantalum oxide film preferably made of $Ta_2O_5$. The thickness of the tantalum oxide film is preferably equal to about 50 nm, and the first and the second insulators 151 and 152 may include aluminum oxide such as $Al_2O_3$.

A plurality of first and second bottom electrodes 190a and 191b preferably made of transparent conductive material such as ITO (indium tin oxide) or IZO (indium zinc oxide) are also formed on the substrate 110. The bottom electrodes 190a and 190b are disposed between the first select lines 121 and the second select lines 122, and each bottom electrode 190a or 190b has a shape of substantially a rectangle elongated in a longitudinal direction. Each of the first bottom electrodes 190a includes first and second contact portions 191a and 192a projected from short edges of the first bottom electrode 190a and extending close to the first and the second input electrodes 123 and 124, respectively. Similarly, each of the second bottom electrodes 190b includes first and second contact portions 191b and 192b projected from short edges of the second bottom electrode 190b toward the first and the second select lines 121 and 122, respectively. The first/second contact portions 191a/192a of the first bottom electrodes 190a and the first/second contact portions 191b/192b of the second bottom electrodes 190b are disposed opposite each other with respect to the first/second input electrodes 123/124. In the meantime, the first and the second bottom electrodes 190a and 190b may be made of reflective material for a reflective LCD.

A plurality of first and second output electrodes 141 and 142 are formed on the substrate 110, too. The first/second output electrodes 141/142 overlap the first/second input electrodes 123/124 with interposing the first/second insulators 151 and 152. The first output electrodes 141 are connected to the first contact portions 191a and 191b of the first and the second bottom electrodes 190a and 190b, and similarly, the second output electrodes 142 are connected to the second contact portions 192a and 192b of the first and the second bottom electrodes 190a and 190b.

A first insulator 151 as well as a first output electrode 141 and a first input electrode 123 forms a first MIM diode D1, while a second insulator 152 as well as a second output electrode 142 and a second input electrode 124 forms a second MIM diode D2.

The contact area S1/S3 between a first output electrode 141 and the first/second bottom electrode 190a/190b is different from the contact area S2/S4 between a second output electrode 142 and the first/second bottom electrode 190a/190b. In detail, the contact area S1 between the first output electrode 141 and the first contact portion 191a of the first bottom electrode 190a is smaller than the contact area S2 between the second output electrode 142 and the second contact portion 192a of the first bottom electrode 190a, while the contact area S3 between the first output electrode 141 and the first contact portion 191b of the second bottom electrode 190b is larger than the contact area S4 between the second output electrode 142 and the second contact portion 192b of the second bottom electrode 190b.

In addition, the contact area S1/S2 between the first bottom electrode 190a and the first/second output electrode 141/142 is different from the contact area S3/S4 between the second bottom electrode 190b and the first/second output electrode 141/142. In detail, the contact area S1 between the first output electrode 141 and the first contact portion 191a of the first bottom electrode 190a is smaller than the contact area S3 between the first output electrode 141 and the first contact portion 191b of the second bottom electrode 190b, while the contact area S2 between the second output electrode 142 and the second contact portion 192a of the first bottom electrode 190a is larger than the contact area S4 between the second output electrode 142 and the second contact portion 192b of the second bottom electrode 190b.

Each of the first and the second MIM diodes D1 and D2 turns on only when a voltage level of the select pulse from the select line 121 or 122 is higher than a predetermined threshold voltage level since the insulators 151 and 152 have a nonlinear current-voltage characteristic. When the MIM diode D1 and D2 turns on, the signal from the select line 121 or 122 experiences an internal resistance of the MIM diode D1 or D1 and contact resistances between the MIM diode D1 or D2 and the bottom electrodes 190a and 190b. Since the contact resistance depends on the contact area and the contact areas S1–S4 between the MIM diode D1 or D2 and the first and the second bottom electrodes 190a and 190b are different, a voltage effectively applied to the first bottom electrode 190a may be different from a voltage effectively applied to the second bottom electrode 190b due to the difference in the voltage drop given by the total resistance including the internal resistance and the contact resistance. Moreover, since the contact area between the MIM diode D1 and the first/second bottom electrode 190a/190b is different from the contact area between the MIM diode D2 and the first/second bottom electrode 190a/190b, the voltages supplied from the MIM diode D1 and from the MIM diode D2 are not symmetrical although the internal resistances of the MIM diodes D1 and D2 are equal and the select pulses on the first and the second select lines 121 and 122 are symmetrical. As a result, the effective voltage charged in the first bottom electrode 190a is different from the effective voltage charged in the second bottom electrode 190b. The difference in the effective voltages can be controlled by adjusting the contact areas S1–S4 and the internal resistance of the MIM diodes D1 and D2, and it is preferably in a range between about 0.3 V and about 1.5 V. For example, the internal resistance of the MIM diodes D1 or D2 can be adjusted by varying overlapping area between the input electrode 123 or 124 and the output electrode 141 or 142.

Since the voltages applied to the first and the second bottom electrodes 190a and 190b are different, the electric fields generated between the first and the second bottom electrodes 190a and 190b and the data line on the upper panel are different. Accordingly, the distortion of the gamma curve is reduced to improve the visibility of the LCD.

When the MIM diode D1 or D2 turns off, the bottom electrode 190a or 190b becomes floating and the voltage applied to the bottom electrode 190a or 190b is maintained by a LC capacitor including the bottom electrode 190a or 190b, the data line, and the LC layer interposed therebetween until a next select pulse is applied to the MIM diode D1 or D2.

Since the polarity of adjacent two select pulses are opposite, the sign of the voltage difference between the first bottom electrode 190a and the second bottom electrode 190b is reversed every frame.

An LCD according to an embodiment of the present invention will be described in detail with reference to FIGS. 3 and 4.

Figure 3:
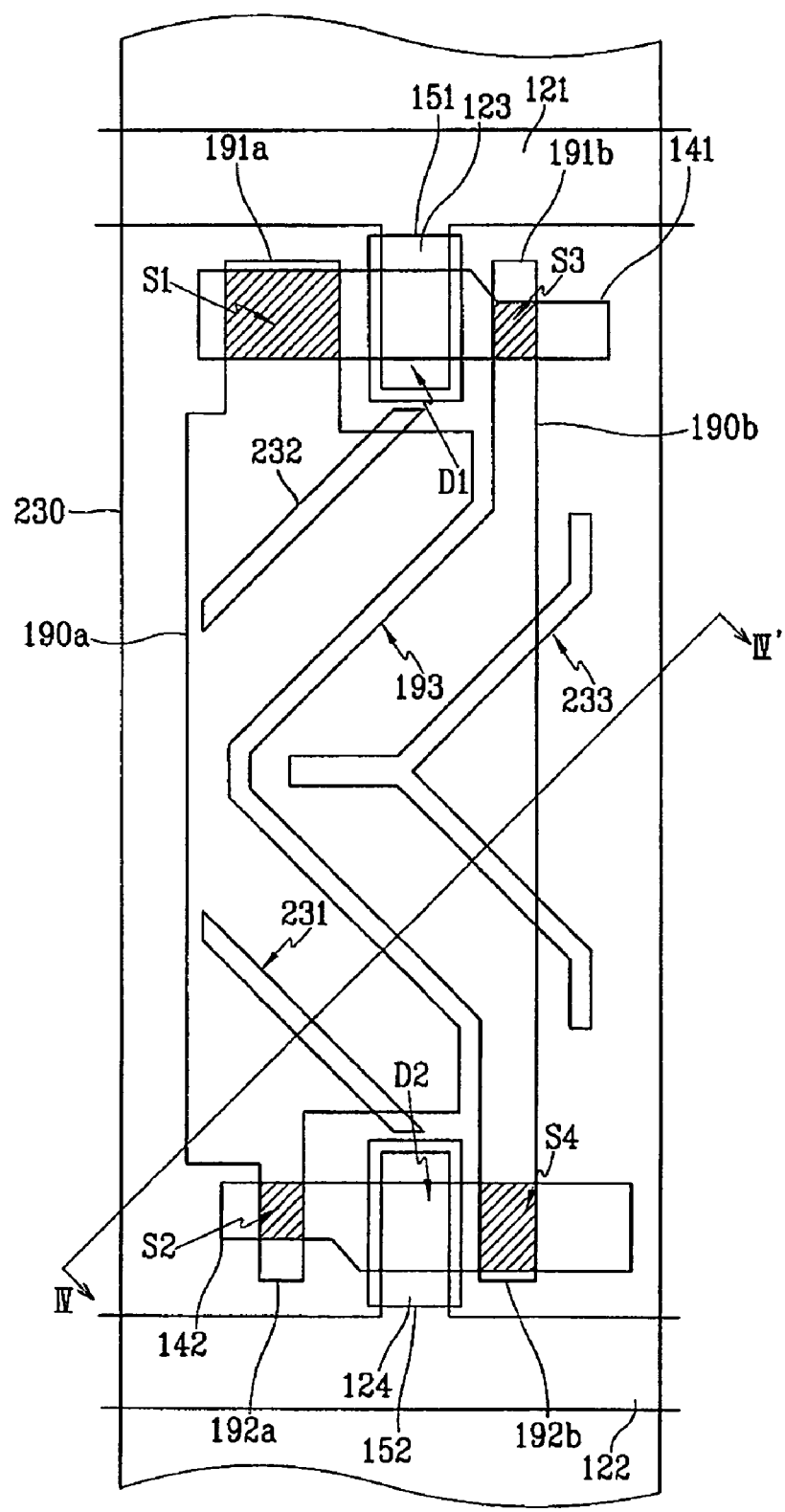
FIG. 3 is a layout view of an LCD according to an embodiment of the present invention.
Figure 4:
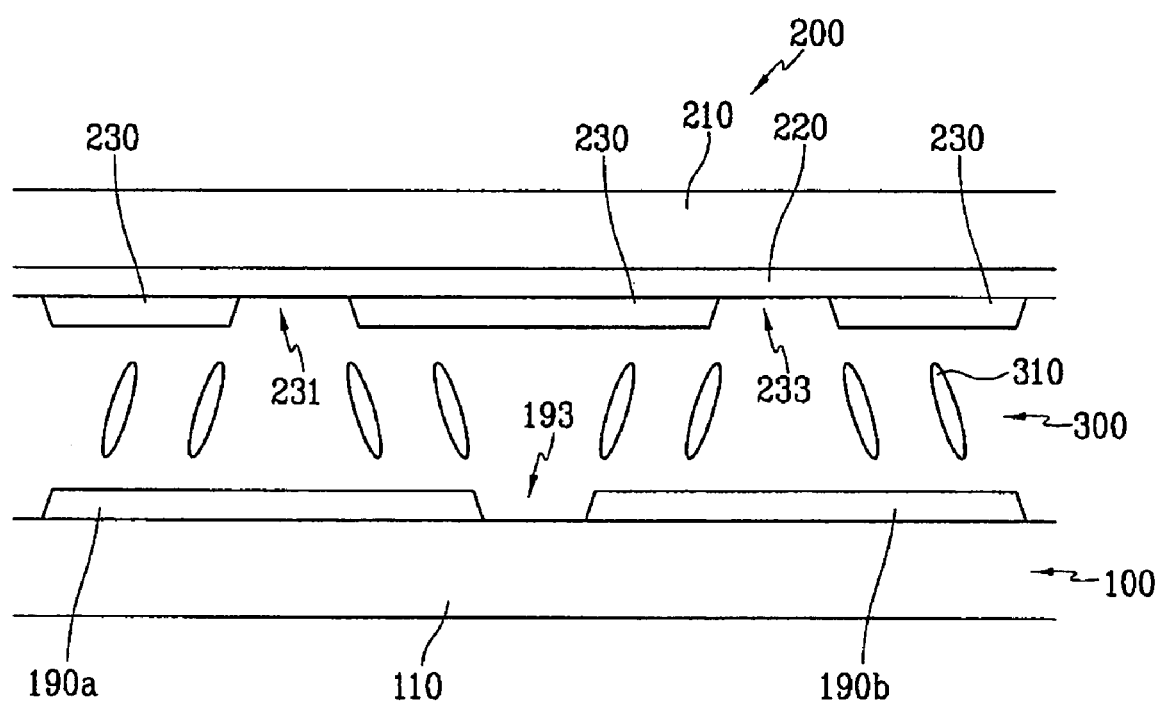
FIG. 4 is a sectional view of the LCD shown in FIG. 3 taken along the line IV–IV'.

FIG. 3 is a layout view of an LCD according to an embodiment of the present invention, and FIG. 4 is a sectional view of the LCD shown in FIG. 3 taken along the line IV–IV'.

Referring to FIGS. 3 and 4, a liquid crystal display according to an embodiment of the present invention includes a lower panel 100, an upper panel 200 facing the lower panel 200, and a liquid crystal layer 300 interposed therebetween.

A layered structure of the lower panel 100 according to this embodiment is almost the same as that shown in FIGS. 1 and 2.

In detail, a plurality of first and second select lines 121 and 122 including a plurality of first and second input electrodes 123 and 124 and a plurality of first and second bottom electrodes 190a and 190b including first and second contact portions 191a, 191a, 192a and 192b are formed on an insulating substrate 110. The first and the second input electrodes 123 and 124 are covered with first and second insulators 151 and 152 and a plurality of first and second output electrodes 141 and 142 are formed on the first and the second insulators 151 and 152 and the first and the second contact portions 191a, 191b, 192a and 192b of the first and the second bottom electrodes 190a and 190b.

Different from the TFD array panel shown in FIGS. 1 and 2, inner edges of a pair of first and second bottom electrodes 190a and 190b, which form a gap 193 having a substantially uniform width, have a shape of a chevron or an inequality sign (<). Accordingly, the gap 193 between the opposite edges of the first and the second electrodes 190a and 190b also has a shape of a chevron. Each gap 193 includes a pair of lower and upper oblique portions, a center longitudinal portion, and lower and upper terminal longitudinal portions. The oblique portions preferably make an angle of about 45 degrees with the select lines 121 and 122 and they are connected to the center longitudinal portion. However, the center longitudinal portion may be omitted such that the oblique portions meet each other. The terminal longitudinal portions are connected to respective ends of the oblique portions.

The description of the common electrode panel follows.

A plurality of color filters 220 are formed on an insulating substrate 210 such as a transparent glass. Each color filter 220 may represent one of three primary colors such as red, green and blue colors.

A plurality of data lines 230 preferably made of transparent material such as ITO and IZO are formed on the color filters 220. The data lines 230 extend substantially in a longitudinal direction to intersect the select lines 121 and 122. Each data line 230 is wide enough to cover a pair of first and second bottom electrodes 190a and 190b and has a plurality of sets of lower, upper, and center cutouts 231–233. The center cutout 233 having a transverse portion extending toward the center longitudinal portion of a gap 193 between a pair of first and second bottom electrodes 190a and 190b, a pair of lower and upper oblique portions extending substantially parallel to the lower and the upper oblique portions of the gap 193 from an end of the transverse portion, respectively, and a pair of lower and upper longitudinal portions connected to respective ends of the oblique portions with making obtuse angles. The lower and the upper oblique cutouts 231 and 232 extend substantially parallel to the lower and the upper oblique portions of the gap 193, respectively, and they are disposed opposite the lower and the upper oblique portions of the center cutout 233 with respect to the lower and the upper oblique portions of the gap 193.

A light blocking member called a black matrix (not shown) may be formed on the insulating substrate 210. The light blocking member prevents light leakage between the bottom electrodes 190a and 190b and defines open areas facing the bottom electrodes 190. The light blocking member may overlap the cutouts 231–233 for preventing the light leakage near the cutouts 231–233.

The LC layer 300 has negative dielectric anisotropy and the LC molecules 310 in the LC layer 300 are aligned such that their long axes are vertical to the surfaces of the panels 100 and 200 in absence of electric field.

Homeotropic alignment layers (not shown) enforcing the initial orientation of the LC molecules 310 are coated on inner surfaces of the lower and the upper panels 100 and 200, and a polarizer or a pair of a polarizer and an analyzer (not shown) are provided on outer surface(s) of the panels 100 and 200 such that their transmissive axes are crossed and one of the transmissive axes is parallel to the select lines 121 and 122.

The LCD may further include at least one retardation film for compensating the retardation of the LC layer 3 and a backlight unit for providing light for the LCD.

Upon application of a select voltage to the bottom electrodes 190a and 190b and a data voltage to the data lines 230, an electric field substantially perpendicular to the surfaces of the panels 100 and 200 is generated. The LC molecules 310 tend to change their orientations in response to the electric field such that their long axes are perpendicular to the field direction. In the meantime, the cutouts 231–233 of the data lines 230 and the inner edges of the bottom electrodes 190a and 190b distort the electric field to have a horizontal component which determines the tilt directions of the LC molecules 310. The horizontal component of the primary electric field is perpendicular to the edges of the cutouts 231–233 and the edges of the bottom electrodes 190.

Accordingly, a plurality of sub-regions having different tilt directions, which are partitioned by the gap 193 and the cutouts 231–233, are formed in a pixel region of the LC layer 300, which are located on the pair of first and second pixel electrodes 190a and 190b. The various tilt directions of the LC molecules 310 improve the viewing angle of the LCD.

The cutouts 271 may be substituted with protrusions preferably made of organic material and this reduces the resistance of the data lines 230.

The LCD may be a twisted nematic (TN) mode LCD where the LC layer 300 may be horizontally aligned in a twisted manner or may be an optically compensated bend (OCB) mode LCD.

Figure 5:
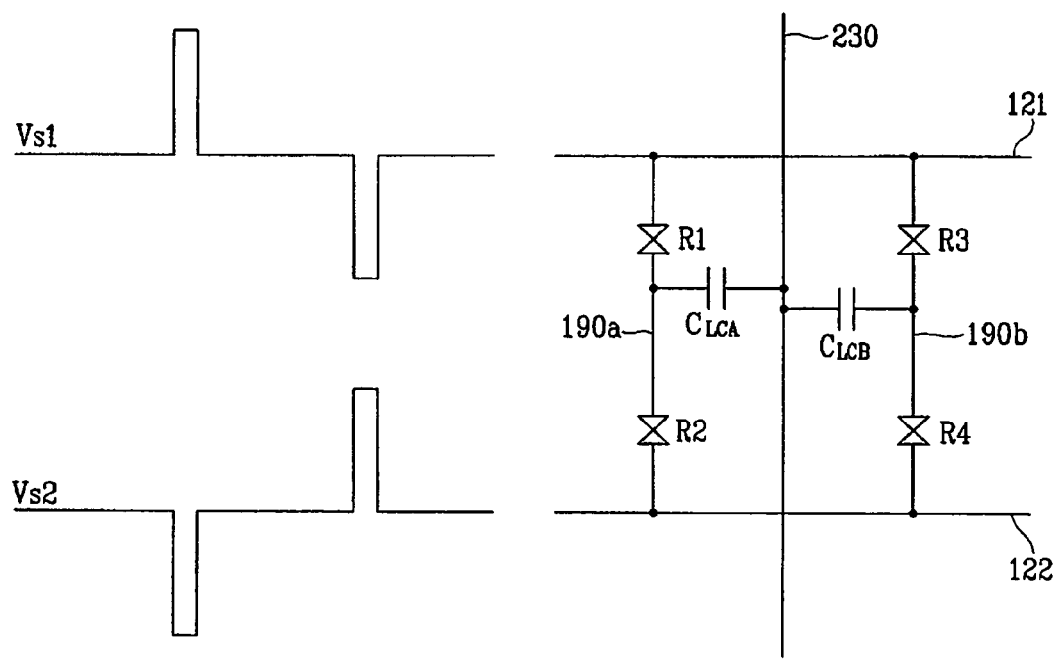
FIG. 5 is an equivalent circuit diagram of a pixel of a TFD LCD according to an embodiment of the present invention.

FIG. 5 is an equivalent circuit diagram of a pixel of a TFD LCD according to an embodiment of the present invention.

Referring to FIG. 5, an LCD according to an embodiment of the present invention includes a plurality of pairs of first and second select lines 121 and 122, a plurality of data signal lines 230, and a plurality of pixels.

Each pair of first and second signal lines transmit select pulses having equal voltage but opposite polarity with respect to a reference voltage. The data signal lines 230 are supplied with data voltages.

Each pixel includes first and second LC capacitors $C_{LCA}$ and $C_{LCB}$ and four MIM diodes R1–R4 connected thereto. The MIM diodes R1–R4 represent a pair of MIM diodes D1 and D2 coupled with the contact resistances shown in FIGS. 1–4.

Each LC capacitor $C_{LCA}$ or $C_{LCB}$ is connected to a data signal line 230 and also connected to a pair of first and second select lines 121 and 122 through the MIM diodes R1 and R2 or R3 and R4, respectively. Referring to FIG. 4, each of the LC capacitors $C_{LCA}$ and $C_{LCB}$ may be formed by a bottom electrode 190a or 190b, a data signal line 230, and a region of the LC layer 300 disposed therebetween.

Each MIM diode R1–R4 is considered to have a resistance including internal resistance and contact resistance with the LC capacitor $C_{LCA}$ or $C_{LCB}$.

The resistance of the MIM diode R1/R3 connected between the first/second LC capacitor $C_{LCA}/C_{LCB}$ and the first select line 121 is different from that of the MIM diode R2/R4 connected between the first/second LC capacitor $C_{LCA}/C_{LCB}$ and the second select line 122. In addition, the resistance of the MIM diode R1/R2 connected between the first LC capacitor $C_{LCA}$ and the first/second select line 121/122 is different from that of the MIM diode R3/R4 connected between the second LC capacitor $C_{LCB}$ and the first/second select line 121/122.

When a pair of select pulses Vs1 and Vs2 are applied to the first and the second select signal lines 121 and 122, different voltages are charged in the LC capacitors $C_{LCA}$ and $C_{LCB}$ for controlling the transmittance of light passing through the light. In the next frame, another pair of select pulses Vs1 and Vs2 having reversed polarity are applied to the select signal lines 121 and 122 and data voltages also having reversed polarity are applied to the data lines. Therefore, the voltages charged in the LC capacitors $C_{LCA}$ and $C_{LCB}$ have reversed polarity, and thus two different gamma curves cover the LCD. At this time, an observer views an image through an averaged gamma curve at the front side. At the lateral side, the observer views an image compensated by one of the two gamma curves, which is not distorted, and thus the visibility in the lateral side is improved.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
   a pair of first and second signal lines transmitting select pulses having opposite polarity;
   a third signal line transmitting data voltages;
   a first field generating electrode formed between the first signal line and the second signal line;
   a first diode connected between the first signal lines and the first field generating electrode; and
   a second diode connected between the second signal lines and the first field generating electrode and having a resistance different from the first diode.

2. The liquid crystal display of claim 1, further comprising:
   a second field generating electrode formed between the first signal line and the second signal line and separated from the first field generating electrode with a gap;
   a third diode connected between the first signal line and the second field generating electrode; and
   a fourth diode connected between the second signal line and the second field generating electrode and having a resistance different from the third diode,
   wherein the first and the second field generating electrode are corresponding to the same third signal line transmitting data voltages.

3. The liquid crystal display of claim 2, wherein the first to fourth diodes comprise MIM diodes.

4. The liquid crystal display of claim 2, wherein the third signal line has at least one cutout or protrusion.

5. The liquid crystal display of claim 2, wherein the first diode and the fourth diode provide substantially same resistance, and wherein the second diode and the third diode provide substantially same resistance.

6. A diode array panel for a display device comprising:
   a substrate;
   a pair of first and second signal lines transmitting select pulses having opposite polarity;
   a first field generating electrode formed between the first signal line and the second signal line;
   a first diode connected between the first signal line and the first field generating electrode; and
   a second diode connected between the second signal line and the first field generating electrode and having a resistance different from the first diode.

7. The diode array panel of claim 6, further comprising:
   a second field generating electrode formed between the first signal line and the second signal line and separated from the first field generating electrode with a gap;
   a third diode connected between the first signal line and the second field generating electrode; and
   a fourth diode connected between the second signal line and the second field generating electrode and having a resistance different from the third diode,
   wherein the first and the second field generating electrode are included in a pixel.

8. The diode array panel of claim 7, wherein the diodes comprise MIM diodes.

9. The diode array panel of claim 7, wherein the MIM diodes include first and second input electrodes connected to the first and the second signal lines, respectively, first and second insulators disposed on the first and the second input electrodes, respectively, and first and second output electrodes disposed on the first and the second insulators, respectively, and connected to the first and the second bottom electrodes, respectively.

10. The diode array panel of claim 7, wherein the first diode and the fourth diode provide substantially same resistance, and wherein the second diode and the third diode provide substantially same resistance.

* * * * *